2,717,906

PHOSPHONATION OF AROMATIC COMPOUNDS

Hans Z. Lecher, Plainfield, and Tsai Hsiang Chao and Karl C. Whitehouse, Somerville, N. J., assignors to American Cyanamid Company, New York, N. Y., a corporation of Maine No Drawing. Application March 27, 1953,
Serial No. 345,264

17 Claims. (Cl. 260—500)

This invention relates to a new process of preparing carbocyclic aromatic phosphonic acids.

A number of aromatic monophosphonic acids having the formula

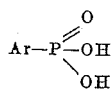

in which Ar is an aromatic residue have been known for some time but could be prepared only by roundabout and expensive processes which precluded their practical utilization. Generally, the compounds were prepared by condensing first the aromatic hydrocarbon in question with phosphorus trichloride in a Friedel-Crafts type reaction using aluminum chloride as a condensing agent. A substantial excess of phosphorus trichloride and one molecular equivalent of high-grade, expensive aluminum chloride had to be used and were not recoverable. The aluminum chloride complex of the aryl-dichlorophosphine was by no means pure as there was a varying tendency to form diaryl-monochlorophosphines. The phosphorus is of course of the wrong valence and in order to arrive at a compound which is transformable into a phosphonic acid, the valence of phosphorus has to be increased from 3 to 5. This was done in the past, e. g. by chlorinating to produce an aryl-tetrachloro-phosphorane $ArPCl_4$ which was then freed from the aluminum compound after esterification with an alcohol; the phosphonic acid was finally obtained by saponification. Splitting of the aryl-dichlorophosphine-aluminum chloride complex with a limited amount of water has also been proposed. A modification involved the separation of the aryl-dichlorophosphine from the aluminum chloride by treatment with phosphorus oxychloride. However, these modifications still required the chlorination of the aryl-dischlorophosphine to the aryl-tetrachloro-phosphorane and subsequent hydrolysis to the phosphonic acid. None of these processes are of any practical use or give aromatic phosphonic acids at a price which would render their practical utilization possible.

In many respects aromatic phosphonic acids are comparable to aromatic sulfonic acids which would lead one to expect that they could be produced by a manner similar to sulfonation. However, attempts to react aromatic compounds with phosphoric acid or its anhydrides have failed hitherto.

The present invention is based on the surprising discovery that when operating under conditions widely removed from those which are present in sulfonation reactions, it is possible to react directly an aromatic compound such as an aromatic hydrocarbon with phosphoric anhydride. The phosphonation reaction of the present invention proceeds smoothly and gives aromatic phosphonic acids by a simple and inexpensive process in satisfactory yield.

The most important and critical factor is a sharply defined and very high range of temperature of reaction. At temperatures above 250° C. and particularly at temperatures above 275° C., hexagonal phosphoric anhydride is no longer inert to aromatic hydrocarbons and many other aromatic compounds but readily replaces hydrogen in good yield and without the production of difficultly removable impurities. The top limit of the temperature range is equally sharp and critical and occurs at about 325° C. At higher temperatures polyphosphonation results producing, for example, diphosphonic acids and decomposition starts in, resulting in impurities which render the reaction practically worthless.

A second critical factor in the reaction is the use of an excess of the aromatic compound. This factor is, of course, critical only when one wishes to produce the presently more desirable monophosphonic acids. Unless there is a marked excess of aromatic compound di- and polyphosphonation occur. In a broader aspect, of course, the present invention contemplates also the production of polyphosphonic acid products, but in a more specific and preferred modification, a large excess of aromatic compound is important for the production of monophosphonic acids.

In contrast to the analogous sulfonation reaction, the phosphonic acids are not produced directly in a single step. As a matter of fact, they are not stable under the temperature conditions of the reaction. On the contrary, primary reaction products are formed which give the phosphonic acids only on subsequent hydrolysis.

One type of primary reaction product is obtained in the form of a brittle solid or a viscous liquid and is not soluble in the aromatic compound. While it is not desired to limit the invention to a theory of the reaction, there is good evidence to believe that this first type of organophosphorus compound (II) is formed in the present process from one molecule of the aromatic compound and one molecule of hexagonal phosphoric anhydride (I):

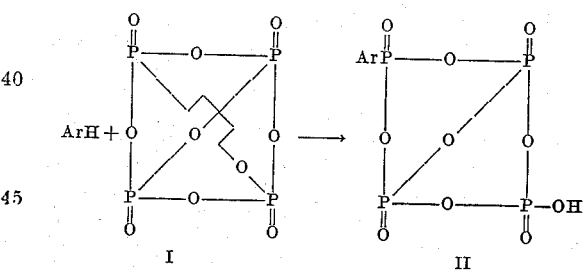

in which Ar stands for the aromatic radical. In the case of the reaction of benzene with hexagonal phosphoric anhydride this is the sole primary reaction product.

However, in the case of substituted benzenes such as e. g. chlorobenzene and o-xylene or in the case of polycyclic compounds such as e. g. naphthalene there is also formed another primary organophosphorus reaction product that is soluble in the aromatic compound. Without limiting the invention to this explanation, there is reasonable evidence to believe that the soluble reaction product is an anhydride of the phosphonic acid (III) which is formed in the following reaction:

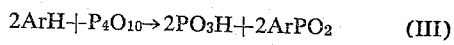

where Ar stands for the aromatic radical. It is to be understood, however, that both the metaphosphoric acid and the anhydride III are polymers and are not monomers as formulated in the above equation. Since metaphosphoric acid is not soluble in the aromatic compounds, it is found in the insoluble pitch together with the reaction product II.

The primary reaction products of type II are hydrolyzed by hot water or hot alkali to produce the aromatic phosphonic acid and orthophosphoric acid or its alkali metal salts. The reaction products of type III are hydrolyzed with formation of the phosphonic acid or its salts.

From the reaction mechanism above set forth, it is apparent that the actual reaction should involve one or two molecules of the aromatic compound and one molecule of $P_4O_{10}$. However, as pointed out above, in the absence of a large excess of the aromatic compound, monophosphonic acids cannot be produced in reasonable yield and pure form. We have found that at least five molecules of the aromatic compound to one of $P_4O_{10}$ are necessary to insure a satisfactory yield of the monophosphonic acids and this amount of excess therefore constitutes the lower limit of the preferred modification of the present invention.

It goes without saying that the reactants must be anhydrous since water would react with phosphoric anhydride producing metaphosphoric acid which is not reactive in this type of reaction. Unless anhydrous conditions are maintained, therefore, a serious lowering of the yield results.

It is known that phosphoric anhydride exists in three crystalline modifications: the hexagonal modification which is the ordinary commercial phosphoric anhydride that corresponds to the formula of $P_4O_{10}$ and has the structure I shown above; further, the orthorhombic and the tetragonal forms which constitute macro-molecules of the formula $(P_2O_5)x$. We have found that the last two mentioned modifications also do react, but that the reaction with the orthorhombic and particularly with the tetragonal form is very sluggish and therefore unsuited for the present reaction. Otherwise the phosphoric anhydride needs not be chemically pure and the ordinary commercial product can be used with good success.

Despite the very high temperature and the known corrosive effects at high temperatures of phosphoric acid compounds, we have found that the present reaction does not raise any corrosion problem and reaction vessels of ordinary metals, such as mild steel, stainless steel, nickel, aluminum, Monel and the like can be used without any corrosion problem or contamination of the product by reaction with the metal of the vessel.

Since the reactants are not mutually soluble, vigorous and continued agitation is necessary and it is in the nature of such a reaction that adequate time for the reactants to contact each other is essential. In large commercial operations, very short reaction time of the order of an hour will normally not permit the reaction to go to completion, and with batches of practical size times from 5 to 50 hours, and still better, from 12 to 24 hours are preferred. Of course the time will vary with the size of the batch and with the degree and kind of agitation. Time, therefore, is not a critical factor in the sense that the temperature is, and the reaction can be carried out so long as sufficient time is given for the reactants to contact each other.

As the high temperature range of the reaction is above the boiling point of many aromatic compounds, particularly hydrocarbons of the benzene series, the reaction is ordinarily effected in an autoclave provided with vigorous agitating means. As there is no corrosion problem, ordinary autoclave vessels can be employed and the operation under pressure presents no chemical engineering problem. Of course where the boiling point of the aromatic compound, such as of polynuclear hydrocarbons, is very high, operation at atmospheric pressure is possible and is included.

After the phosphonation reaction is complete, the vessel is permitted to cool. If the organophosphorus compound is almost exclusively in the dark colored undissolved pitch (as is the case with benzene), it is most convenient to decant the unreacted liquid aromatic compound and subject the pitch to hydrolysis. If, however, as is the case with most aromatic compounds, a part of the phosphonation product is dissolved in the aromatic compound, the whole content of the vessel may be treated with water and the excess of the aromatic compound may be stripped off whereby simultaneously a hydrolysis of the primary phosphonation products is accomplished. If the aromatic compound is not sufficiently volatile with steam, it is more expedient to dissolve the organophosphorus compounds with caustic alkali and separate the aqueous layer from the unreacted aromatic compound.

In general, the aromatic monophosphonic acids are far less soluble in water than are the corresponding sulfonic acids, and their precipitation from aqueous solution by cooling and filtration—if necessary after some concentration—normally presents no particular problem. The phosphonic acids are quite soluble in aqueous alkali in the form of their salts and it is of course easy to recover them by a solution of alkali followed by acidification where this procedure is desired. In many cases alkali metal or ammonium salts of the formula $$ArPO_3HM, ArPO_3H_2$$

(where Ar stands for the aromatic radical and M for the cation) show a very low solubility and can be isolated by acidification of the alkaline solution.

The reaction is generally applicable to aromatic compounds provided they are free from polar groups that would react with phosphoric anhydride. It is particularly useful for the phosphonation of carbocyclic aromatic hydrocarbons such as benzene and its homologs (e. g., toluene, ethylbenzene, xylenes), biphenyl, diphenylmethane, naphthalene, tetralin, phenanthrene, anthracene, fluoranthene, acenaphthene, perylene, pyrene, chrysene, etc. It is also very well suited for the phosphonation of halogen derivatives of carbocyclic aromatic hydrocarbons such as fluorobenzene, chlorobenzene, dichlorobenzenes, trichlorobenzenes, bromobenzene, etc.

The primary reaction products of the aromatic compound with phosphoric anhydride of the type II constitute new chemical compounds which are included as such within the scope of the present invention.

The aromatic phosphonic acids may be used for a number of purposes, largely as starting materials for dyestuff intermediates, synthetic resins, drugs, pesticides, lubricant additives and the like. They have an advantage over the corresponding sulfonic acids in that they are easier to isolate and are either not or very much less hygroscopic.

EXAMPLE 1

*Phenylphosphonic acid*

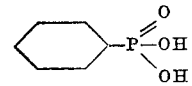

176 parts by weight benzene and 31.2 parts commercial phosphoric anhydride are heated for 24 hours at 275° C. in an autoclave with agitation. The molecular ratio of $C_6H_6:P_4O_{10}$ is 20.7:1. After cooling, the content of the autoclave consists of unreacted benzene and a black, hard, brittle pitch.

This pitchy primary reaction product is generally obtained in a weight corresponding to the sum of all the phosphoric anhydride employed plus one molecular equivalent of benzene. It is hygroscopic and easily soluble in water and in methanol, leaving only small amounts of impurities undissolved. This primary reaction product does not contain orthophosphoric acid, metaphosphoric acid or phosphoric anhydride since its solution in ice water is not precipitated by ammonia and thallous salt. However, when this aqueous solution is boiled, then hydrolysis of the primary reaction product occurs and afterwards ammonia and thallous salt give a copious precipitate of tertiary thallous phosphate. The solution of the primary reaction product in dilute caustic is also hydrolyzed on boiling, but slower.

Before working up it is most convenient to remove the bulk of the unreacted benzene by decantation or siphoning off. Then the pitch is dissolved in water at the boil while simultaneously the remainder of the benzene is stripped off. After clarification the filtrate is concentrated to a volume equivalent to 50 parts of water. The phenylphosphonic acid crystallizes on cooling and is recovered by filtration. It may be purified by recrystallization from 20% hydrochloric acid.

The procedure of the above example was followed varying temperature and keeping time constant and also by keeping temperature constant and varying time. The following table shows the results obtained:

*Comparative yield figures of phenylphosphonic acid*

| Time, hours | Temp., °C. | Yield Based on $P_4O_{10}$ |
| --- | --- | --- |
| 24 | 200 | None. |
| 24 | 225 | Do. |
| 24 | 250 | 37.2%. |
| 24 | 275 | 75.5%. |
| 24 | 325 | 67.0%. |
| 24 | 350 | Low, side products formed. |
| 1 | 275 | Very low. |
| 5 | 275 | 35.2%. |
| 10 | 275 | 47.1%. |

The procedure of the above example was repeated using a smaller excess of benzene, namely, 5 moles per mole of $P_4O_{10}$. The yield and the purity of the product were somewhat lower but still satisfactory.

EXAMPLE 2

The effect of using an insufficient excess of aromatic hydrocarbon was shown as follows.

200 cc. of benzene and 312 g. of commercial phosphoric anhydride were heated in an agitated autoclave for 24 hours at 275° C.; the molecular ratio of benzene:$P_4O_{10}$ corresponded to 2:1. After cooling, some unreacted benzene was decanted and the hard, black, glassy residue was dissolved in water and the solution was clarified. The phosphonic acids formed were recovered by concentrating this aqueous solution and purified by recrystallization from 20% hydrochloric acid and from water. A microscopic investigation of this material showed that it contained phenylphosphonic acid and some other material. The analytical figures obtained showed an average of C 37.9%, H 4.29% and P 21.65%, indicating a mixture of phenylphosphonic acid with a polyphosphonic, probably a diphosphonic acid which, however, could not be isolated.

EXAMPLE 3

*o- and p-tolyl-phosphonic acids*

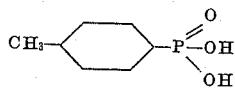

and

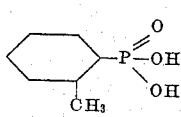

18.4 parts by weight of toluene and 7.1 parts of commercial phosphoric anhydride (ratio $C_7H_7$:$P_4O_{10}$=8:1) were heated in an autoclave with agitation at 275° C. for 10 hours. After cooling, the autoclave content was treated with water, the excess toluene was stripped off, the aqueous solution was clarified and concentrated and gave a mixture of the o- and p-tolylphosphonic acids. Mono-o-toluidine salts showed the correct analysis.

EXAMPLE 4

*2-Naphthyl-phosphonic acid*

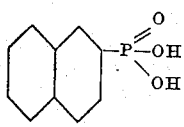

320 parts by weight of naphthalene and 35.5 parts by weight of commercial phosphoric anhydride (ratio $C_{10}H_8$:$P_4O_{10}$=20:1)

are heated in an autoclave with agitation at 275° C. for 24 hours. After the reaction is over and the autoclave has been cooled to about 100° C., its content consists of a dark pitch and a liquid naphthalene phase. The pitch contains an organophosphorus compound of the type II, metaphosphoric acid and by-products. The molten naphthalene contains another organophosphorus compound, which is evidently a polymer of $C_{10}H_7PO_2$. The entire autoclave content is treated with hot water and the unreacted naphthalene is stripped off. The still residue is filtered hot to remove water-insoluble by-products and the filtrate is concentrated to a small volume until the 2-naphthyl-phosphonic acid begins to crystallize out. This, after cooling, is filtered off and recovered. By further concentration of the mother liquor additional quantities of this acid may be obtained.

Instead of with water the autoclave melt may be extracted with a solution of sodium hydroxide in water. In this case nearly all of the charge is dissolved, and the addition of hydrochloric acid precipitates a black resinous material plus the hemisodium salt of 2-naphthyl-phosphonic acid. The hemisodium salt may then be separated by extraction with water.

At 250° C. naphthalene phosphonates very slowly and at 350° C. under the same reaction conditions excessive tar formation takes place. 300° C. gives substantially the same result as described above for 275° C., while at 325° C. by-product formation begins.

Since 1- and 2-naphthyl-phosphonic acids have similar melting points, the structure of the above obtained compound was determined by synthesizing both the alpha- and the beta-naphthyl phosphonic acids from the corresponding alpha- and beta-naphthyl mercury compounds and phosphorus trichloride; the naphthyl-dichloro-phosphines were converted into the naphthyl-tetrachloro-phosphoranes which were hydrolyzed with water. By comparing the melting points and the mixed melting points, it was found that our compound is the beta isomer. Thus, the phosphonation of naphthalene, which occurs at a very high temperature, prefers the beta position exactly as the high temperature sulfonation does.

2-naphthyl-phosphonic acid which may be obtained in very pure form by recrystallization from 20% hydrochloric acid forms colorless crystals melting at 195–196° C. It is very soluble in alcohol and acetone and shows in water the following solubilities:

| Temperature | 0° C. | 25° C. | 50° C. | 75° C. | 100° C. |
| --- | --- | --- | --- | --- | --- |
| g./100 g. water | 0.2 | 0.6 | 1.1 | 1.9 | 3.4 |

In aqueous solution of orthophosphoric acid the solubility at 25° C. is somewhat lower, as shown below, which facilitates the isolation from the aqueous reaction liquor containing considerable amounts of phosphoric acid:

| Strength of $H_3PO_4$ | 5% | 10% | 25% |
| --- | --- | --- | --- |
| g./100 g. acid | 0.5 | 0.2 | 0.1 |

Like the para-tolyl-phosphonic acid, the naphthyl-beta-phosphonic acid gives a very stable and sparingly soluble hemisodium phosphonate

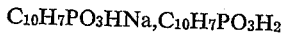

$C_{10}H_7PO_3HNa, C_{10}H_7PO_3H_2$

The solubility of this salt is as follows:

| Temperature | 25° C. | 100° C. |
| --- | --- | --- |
| g./100 g. acid | 0.6 | 3.0 |

The calcium and magnesium salts of naphthyl-beta-phosphonic acid are very sparingly soluble and the barium salt shows a solubility of only 0.5 g. at 25° C. and 0.3 g. at 100° C. per 100 g. of water, thus making a separation from tertiary barium phosphate impractical.

The rather insoluble mono-ortho-toluidine salt melts at 198 to 200° C. and may be recrystallized from water or alcohol.

2-naphthyl-phosphonic acid decomposes on heating to 275° C. completely into naphthalene and metaphosphoric acid, a fact which proves that it is not present as such in the original phosphonation product.

EXAMPLE 5

*Naphthylene di(betaphosphonic) acid*

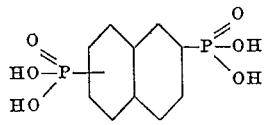

A mixture of 1386 parts by weight of naphthalene and 568 parts by weight of commercial phosphoric anhydride (molecular ratio $C_{10}H_8:P_4O_{10}=5.5:1$) was subjected to a reaction exactly as described in Example 4. The extraction of the autoclave melt was done with hot water and the naphthyl-beta-phosphonic acid which had precipitated on cooling was removed by filtration. The mother liquor was further concentrated and a further crop of the monophosphonic acid was separated. The final filtrate was further concentrated until it became rather viscous; it slowly deposited a precipitate which was recrystallized from 20% hydrochloric acid and subsequently from methanol. This is a naphthylene-diphosphonic acid (as shown by analysis and its neutralization equivalent) in which the position of the second phosphonic group is questionable. It forms plates which decompose at 300 to 310° C. and is exceedingly soluble in water.

EXAMPLE 6

*Pyryl-phosphonic acid*

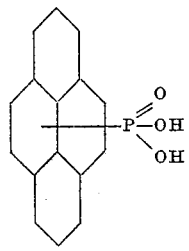

35.5 parts by weight of commercial phosphoric anhydride are added to 202 parts of molten pyrene at 165° C. The mixture is heated with stirring to 260° C. The reaction mixture gradually solidifies. It was first treated with hot water and then extracted with hot sodium hydroxide solution. The alkaline solution was acidified with hydrochloric acid and deposited a pyryl-monophosphonic acid of unknown structure which could be purified by recrystallization from glacial acetic acid. It showed the correct neutralization equivalent and melted at 210° C. with decomposition.

EXAMPLE 7

*Chrysyl-phosphonic acid*

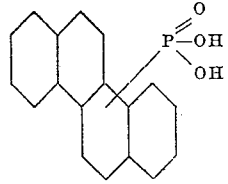

35.5 parts by weight of commercial phosphoric anhydride were added to 228 parts of molten chrysene at 260° C. The reaction mixture was heated with stirring at 275° C. for 2 hours; it gradually solidified. It was first treated with boiling water and then extracted with hot sodium hydroxide solution. The alkaline extract was acidified with hydrochloric acid and precipitated a chrysyl-monophosphonic acid of unknown structure which showed the correct neutralization equivalent.

EXAMPLE 8

*Phenanthryl-phosphonic acid*

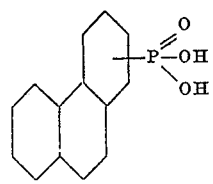

The procedure of Example 7 is followed substituting phenanthrene for chrysene. A monophosphonic acid is obtained in good yield, the exact position of the phosphonic group being undetermined as in the preceding two examples.

EXAMPLE 9

*O- and p-chlorophenyl-phosphonic acids*

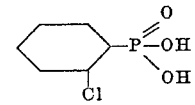

and

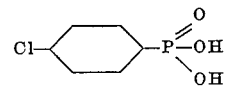

338 parts by weight of chlorobenzene and 42.7 parts of commercial phosphoric anhydride (ratio $C_6H_5Cl:P_4O_{10}=20:1$) are heated in an autoclave with agitation at 310° C. for 24 hours. After cooling the autoclave contains a hard, black pitch and a chlorobenzene solution. The pitch contains an organophosphorus compound, which apparently corresponds to the formula II, metaphosphoric acid and by-products. The chlorobenzene solution contains polymeric anhydrides of the chlorophenyl-phosphonic acids. Both the pitch and the chlorobenzene solution are treated with water and the unreacted chlorobenzene is stripped off. The still residue is filtered to remove some dark by-product and the filtrate is concentrated. On cooling, a mixture consisting predominantly of p-chlorophenyl-phosphonic acid and less o-chlorophenyl phosphonic acid precipitates. The pure para acid may be obtained by recrystallization.

The chlorobenzene solution obtained as described above may be separated from the pitch and gives on evaporation under reduced pressure a sirup which shows the correct analysis for an anhydride of a chlorophenyl-phosphonic acid. The chlorobenzene solution may be also treated with a very small amount of water which hydrates the anhydride whereupon the chlorophenyl-phosphonic acids crystallize.

EXAMPLE 10

*(1,2-dimethylphenyl)-phosphonic acids*

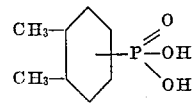

264.3 parts by weight of o-xylene and 71 parts of commercial phosphoric anhydride (ratio $C_8H_{10}:P_4O_{10}=10:1$) are heated in an autoclave with agitation at 275° C. for 24 hours. After cooling, water is added and the unreacted o-xylene is stripped off. The aqueous still residue is filtered to remove a dark by-product and the solution is concentrated to a small volume and cooled whereupon the phosphonic acid crystallizes in needlelike crystals.

It melts after recrystallization at 150 to 151.5° C. It seems that essentially only one isomer is formed which very probably is the (1,2-dimethylphenyl)-4-phosphonic acid.

This is a continuation-in-part of our application Serial No. 286,614 filed May 7, 1952, now abandoned.

We claim:

1. In the production of an aromatic phosphonic acid the step which comprises phosphonating a carbocyclic aromatic compound—free from polar groups capable of reacting with phosphoric anhydride—at a temperature from 250 to 325° C. with hexagonal phosphoric anhydride in the presence of a substantial excess of the aromatic compound.

2. A process according to claim 1 in which the carbocyclic aromatic compound is present in an amount of at least 5 moles per mole of $P_4O_{10}$.

3. A process for producing a carbocyclic aromatic monphosphonic acid which comprises hydrolyzing the phosphonation products obtained by the process of claim 2 by means of an aqueous hydrolyzing medium at elevated temperatures.

4. A process according to claim 1 in which the aromatic compound is benzene and the reaction is carried out under pressure.

5. A process according to claim 4 in which the benzene is present in an amount of at least 5 moles per mole of $P_4O_{10}$.

6. A process for producing phenyl-phosphonic acid which comprises hydrolyzing the phosphonation product obtained according to the process of claim 4 by means of an aqueous hydrolyzing medium at elevated temperatures.

7. A process according to claim 1 in which the aromatic compound is naphthalene and the reaction is carried out under pressure.

8. A process according to claim 7 in which the naphthlene is present in an amount of at least 5 moles per mole of $P_4O_{10}$.

9. A process of producing 2-naphthylphosphonic acid which comprises hydrolyzing the phosphonation products obtained by the process of claim 8 by means of an aqueous hydrolyzing medium at elevated temperatures.

10. A process according to claim 1 in which the aromatic compound is o-xylene and the reaction is carried out under pressure.

11. A process according to claim 10 in which the o-xylene is present in an amount of at least 5 moles per mole of $P_4O_{10}$.

12. A process for producing (1,2-dimethylphenyl)-phosphonic acids which comprises hydrolyzing the phosphonation products obtained by the process of claim 11 by means of an aqueous hydrolyzing medium at elevated temperatures.

13. A process according to claim 1 in which the aromatic compound is chlorobenzene and the reaction is carried out under pressure at 300 to 325° C.

14. A process according to claim 13 in which the chlorobenzene is present in an amount of at least 5 moles per mole of $P_4O_{10}$.

15. A process for producing chlorophenyl-phosphonic acids which comprises hydrolyzing the phosphonation products obtained by the process of claim 14 by means of an aqueous hydrolyzing medium at elevated temperatures.

16. An organophosphorus compound having the formula:

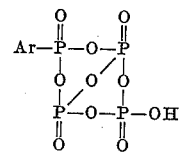

in which Ar stands for a carbocyclic aromatic radical united to phosphorus by a carbon to phosporus bond, and being free from substituent groups reactive with phosphoric anhydride.

17. A product according to claim 16 in which the aryl radical is phenyl.

No references cited.